United States Patent
Johnson

[15] 3,667,578
[45] June 6, 1972

[54] BI-DIRECTIONAL DRIVE RELEASED BRAKE

[72] Inventor: Robert M. Johnson, Levittown, Pa.
[73] Assignee: Harold Beck & Sons, Inc., Newtown, Pa.
[22] Filed: May 14, 1971
[21] Appl. No.: 143,535

[52] U.S. Cl. ............................................. 192/8 R, 188/72.2
[51] Int. Cl. .................................... F16d 67/00, F16d 55/48
[58] Field of Search ............................................. 192/8 R, 7

[56] References Cited

UNITED STATES PATENTS

| | | | |
|---|---|---|---|
| 1,634,861 | 7/1927 | Weymann | 192/8 R |
| 2,834,443 | 5/1958 | Olchawa | 192/8 R |

*Primary Examiner*—Benjamin W. Wyche
*Attorney*—Paul & Paul

[57] ABSTRACT

A bi-directional stop clutch or brake for power transmitting rotating shafts is disclosed in which a friction disc is fixed to a fixed housing from which a power transmitting shaft extends. A clutch disc adapted to engage said friction disc is rotatably and slidably disposed on the shaft without the housing for braking the shaft. A drive collar is pinned to the shaft concentrically of the friction disc and between the clutch disc and the housing. The drive collar has formed therein a concentric series of conical depressions, and the clutch disc has also formed therein a corresponding series of conical depressions, the two series of depressions being in mutual alignment and holding therebetween a plurality of balls, one ball per each opposed pair of conical depressions. Distally of the clutch disc and spaced apart therefrom is a flanged pinion which is rotatably sleeved upon the shaft and positioned thereon by means of an annular thrust bearing and fixed collar positioned distally thereof. Facing portions of the flanged pinion and clutch disc likewise have corresponding concentric arrangements of conical depressions formed therein so as to house a plurality of balls therein. A helical spring engages the flanged pinion and clutch disc while being in compression, thereby normally urging the clutch disc into frictional engagement with the friction disc. The pinion is adapted to be connected to a load to be positioned by rotation of the power shaft. A power application to the shaft causes the pinion to be driven by the cooperating drive collar, balls, clutch disc and balls, while lifting the clutch disc out of frictional engagement with the friction disc. Back load similarly causes the clutch disc to be strongly urged into locking action, when power application ceases.

4 Claims, 6 Drawing Figures

INVENTOR.
Robert M. Johnson

BY
Paul + Paul
ATTORNEYS

INVENTOR.
Robert M. Johnson

BY Paul & Paul
ATTORNEYS.

BI-DIRECTIONAL DRIVE RELEASED BRAKE

This invention relates to a stop clutch mechanism, and more particularly it relates to a stop clutch for use with respect to power driven bi-directional rotating shafts which are subject to back loading. Such shafts are well known in the field of control systems, where, for instance a servo electric motor is utilized to position a valve in a pipeline having a fluid flowing therein. Variations in fluid flow may cause back drive of the servo mechanism, thereby altering the valve position. Since positive positioning is desirable, various methods have been utilized to prevent significant back drive. One such approach involves the utilization of a spring loaded brake disc adapted to coact with a friction disc affixed to a fixed housing for the power driven shaft. The brake disc is formed as part of a pinion member adapted to transmit power from the shaft. When the shaft is not rotating the spring pressure urges the brake disc against the friction disc which prevents back drive. Normal power transmitting rotation of the shaft acts through a collar and ball drive to lift the brake disc off of the friction disc while driving the pinion. Cessation of power allows the spring pressure to force the brake disc back into braking engagement with the friction disc, and any subsequent back loads are braked by this engagement. However, a disadvantage exists in this arrangement since the spring characteristics must be adequate to tolerate the expected back load. The spring pressure necessary to resist back loading causes excess drag with respect to light positioning loads.

The mechanism of this invention is designed to eliminate the foregoing disadvantages and to provide an improved stop-clutch mechanism.

Referring now to the drawings.

Figure 1:
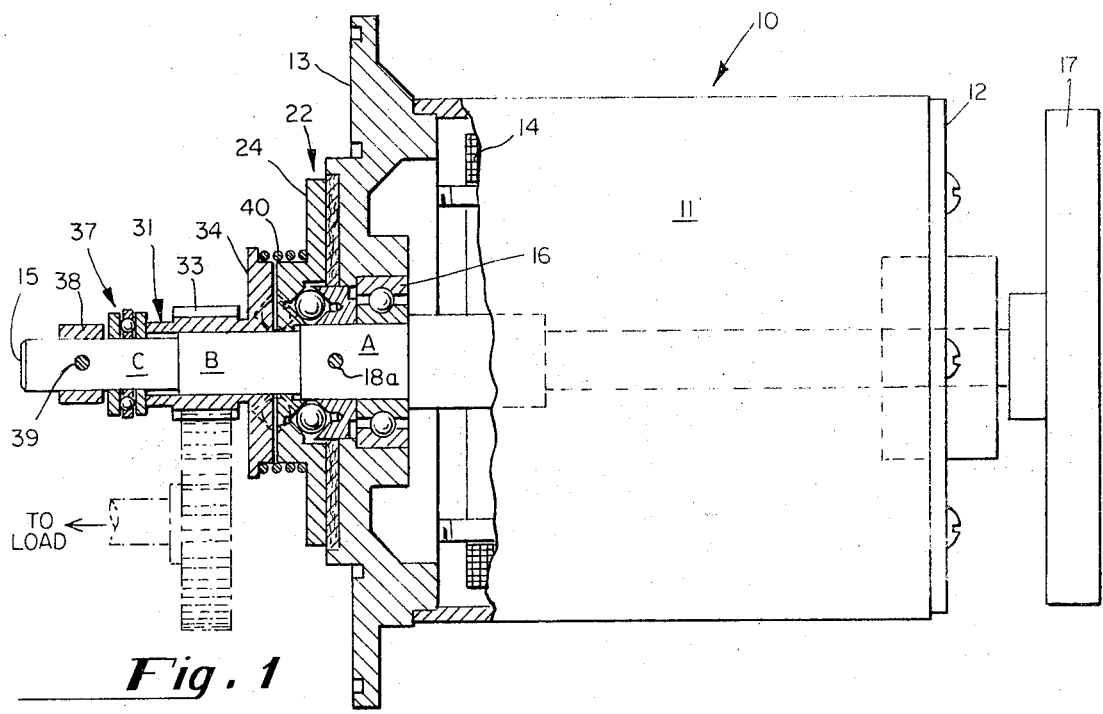
FIG. 1 is a side elevational view of one embodiment of the mechanism of this invention, parts being broken away and shown in section.
Figure 2:
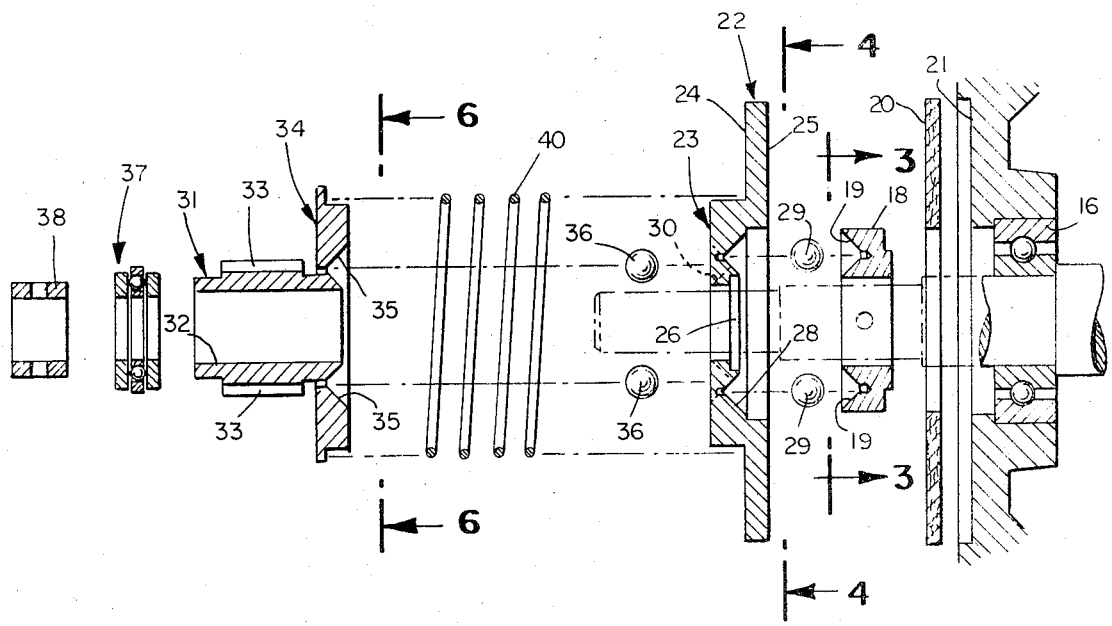
FIG. 2 is an exploded view of a portion of FIG. 1.

Referring to FIGS. 1 and 2, there is shown an electric motor 10 which comprises housing 11, back end plate 12, flanged end plate 13, stator 14, a rotor (not shown) and rotor shaft 15. The shaft 15, is journalled in bearings 16 (one set shown), and has secured to one end thereof handwheel 17. The other end of shaft 15 extends from bearings 16 through a central opening in the flanged end plate 13 and into cooperating engagement with the remaining elements of the stop-clutch mechanism of this invention, which are shown most clearly in exploded view in FIG. 2.

Figure 3:
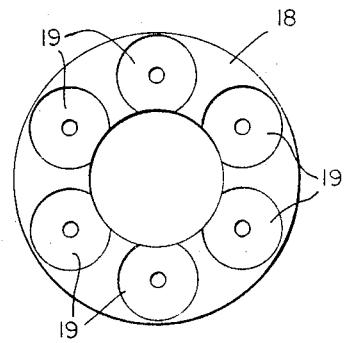
FIG. 3 is a view taken along the lines and in the direction of the arrows 3—3 of FIG. 2.

Annular collar 18 is affixed to shaft 15 by means of pin 18a distally adjacent to a bearing 16. Referring also to FIG. 3, it is seen that the distal face of collar 18 has provided therein a plurality of conical depressions 19, the centers thereof being located on a circular locus which is concentric with shaft 15. Collar 18 extends partially within the central opening of flanged end plate 13, and a cork friction disc 20 having an annular configuration is mounted concentrically therewith and is secured by an adhesive within the annular depression 21 of flanged end plate 13.

Figure 4:
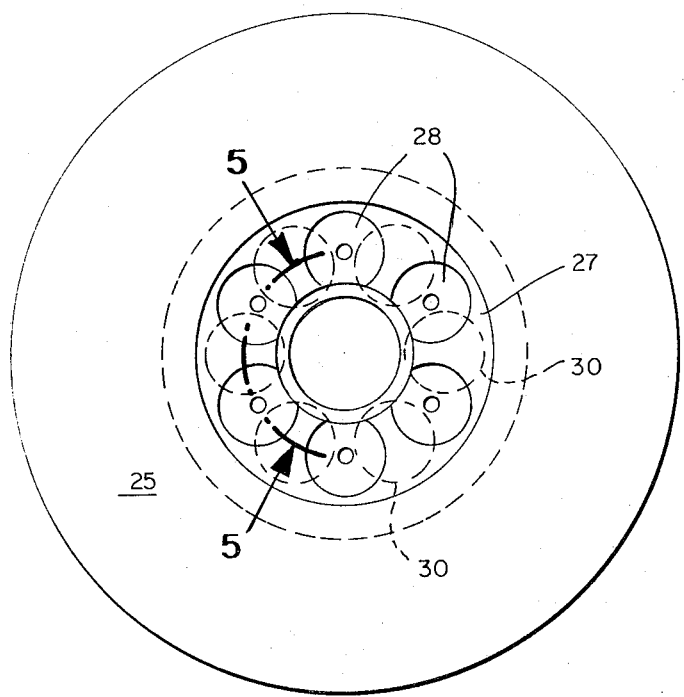
FIG. 4 is a view taken along the lines and in the direction of the arrows 4—4 of FIG. 2.

Clutch disc 22 comprises central hub portion 23 and outer flanged clutching portion 24. The peripheral face surface 25 of clutching portion 24 has an annular configuration which is complementally configured and aligned with the face surface of friction disc 20 to effect clutching engagement therebetween. The hub portion 23 has a central opening formed therein including a shoulder 26, which is so dimensioned as to support the clutch disc 22 in rotatable and axially slidable engagement with portions A and B of shaft 15. Referring also to FIG. 4 it is seen that an annular portion 27 separates the shoulder 26 from the flanged clutching portion 24 and has provided therein a plurality of conical depressions 28, which are complementally configured with depressions 19, and whose centers are likewise located on a circular locus which is concentric with shaft 15. It is also seen that the separate depressions 19 and 28 are radially equally spaced from the centerline of shaft 15 and when mutually aligned form biconical cavities. A plurality of balls 29 are supported in simultaneous rolling contact with collar 18 and brake disc 22 by means of the biconical cavities.

The distal end of hub portion 23 has also formed thereon a plurality of conical depressions 30 (shown in dotted lines in FIG. 4), which are located on a circular locus which is concentric with shaft 15.

Figure 6:
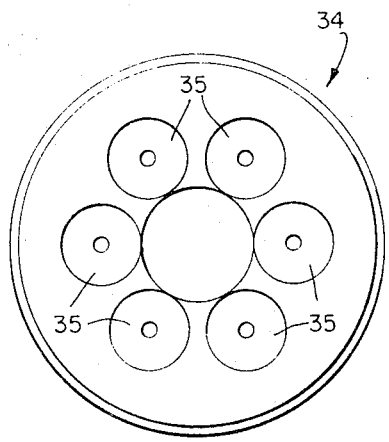
FIG. 6 is a view taken along the lines and in the direction of the arrows 6—6 of FIG. 2.
Figure 5:
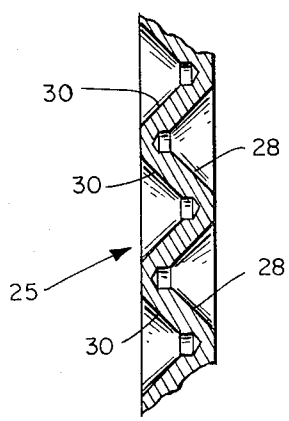
FIG. 5 is a broken sectional view taken along the lines and in the direction of the arrows 5—5 of FIG. 4.

Pinion 31 comprises tubular portion 32 upon which are machined gear teeth 33, and flanged portion 34 (see also FIG. 6). Pinion 31 is rotatably sleeved upon shaft 15 at portion B thereof distally adjacent to clutch disc 22, and is positioned such that flanged portion 34 is mediate of gear teeth 33 and clutch disc 22. The annular surface of flanged portion 34 facing brake disc 22 had formed therein a plurality of conical depressions 35, the centers thereof being located on a circular locus which is concentric with shaft 15. The separate depressions 30 and 35 are radially equally spaced from the centerline of shaft 15 and when mutually aligned form biconical cavities. A plurality of balls 36 are supported in simultaneous rolling contact with pinion 31 and brake disc 22 by means of these biconical cavities.

An annular thrust bearing 37 is rotatably sleeved upon shaft 15 at portion C thereof distally adjacent to pinion 31. An annular terminal collar 38 is sleeved upon shaft 15 and affixed thereto by a pin 39 distally adjacent to thrust bearing 37. A helical spring 40 is maintained in compression between flange portion 24 and flange portion 34.

In conjunction with FIG. 1 there is shown in phantom a gear shaft which engages pinion 31 for the purposes of indicating a normally loaded condition of the embodiment of this invention shown herein.

OPERATION

FIG. 1 shows the stop-clutch mechanism of this invention under no-load condition. That is, no positioning load is being applied by electric motor 10, nor is any external back load being applied from the mechanism engaging pinion 31. In the event that electric motor 10 is excited, the shaft 15 will rotate in a clockwise or counter clockwise direction. As this occurs, the collar 18 rotates similarly, thereby causing balls 29 to exert both a rotary force and an axial force upon clutch disc 22. These forces cause clutch disc 22 to rotate and at the same time move axially of shaft 15 out of a clutching relationship with friction disc 20. Such axial movement is resisted partially by spring 40, and is limited by the abutment of the flange portion 34 of pinion 31. With rotation of clutch disc 22, the balls 36 exert a rotary force upon pinion 31 by reason of their contact in conical depressions 35. The rotation of pinion 31 transmits a positioning force to the desired load. When no further power is transmitted from the motor 10 through shaft 15, the clutch disc 22 is urged back into the position shown in FIG. 1 by spring 40 since it is both rotatable and slidable with respect to shaft 15, and its only restraining contact are the balls 29 and 36 in rolling contact therewith.

It will be readily apparent from this aforementioned sequence of operation that a back load which causes pinion 31 to rotate at a time when the electric motor 10 is not energized, will result in disc 22 being driven by balls 36 into clutching engagement with the cork disc 20. The locking action caused thereby is effected by the frictional nature of the cork disc 20, and the axial pressure exerted by balls 36 against the clutch disc 22. This creates a positive stop-clutch action against back loading of shaft 15, while causing little frictional drag upon the application of a positioning load by motor 10.

It should be understood that the positioning load applied to shaft 15 may be applied by other sources than electric motor 10, such as for example turbine drive means, mechanical linkages and the like. Likewise, it should be understood that the fixed support for the friction disc 20 may be some member other than the housing for the source of rotary power for shaft 15.

An important aspect of this invention is the double row of balls 36 and 29, their housing members 34, 24 and 18, and friction clutch disc 20 which act cooperatively to release the clutch when drive shaft 15 turns, and to set the clutch against rotation in either direction by a back drive at the output end of shaft 15.

While, according to the embodiment of this invention shown in the drawings, pinion 31 is disclosed as the power take-off means of the device, it will be readily understood that other conventional power take-off elements may be alternatively utilized, such as flexible couplings, sleeved couplings, chain drives etc.

Having thus described my invention, I claim:

1. A bi-directional stop clutch comprising fixed housing means; shaft means rotatably journalled in said housing means and having a portion of said shaft means extending without said housing means; drive means adapted to transmit rotary power to said shaft within said fixed housing; annular drive collar means sleeved about and affixed to the shaft adjacent to said fixed housing means; annular friction disc means disposed concentrically about said drive collar means and affixed to said fixed housing; annular clutch disc means rotatably disposed concentrically about the shaft and being axially slidable thereon comprising an integral annular clutching portion which is complementally configured to the annular friction disc means and an integral annular concentric hub portion slidably disposed upon said shaft distally adjacent to said drive collar means, the adjacent annular portions of said drive collar means and said concentric hub portion each having formed therein at least one conical depression at substantially equal distance from the center of said shaft, the respective conical depressions being complementally configured and aligned such that a biconical cavity is formed therebetween; at least one single ball means lodged in each said biconical cavity; rotatable take-off means sleeved upon said shaft distally adjacent to said hub portion of said clutch disc means and having an annular portion formed integrally therewith adjacent the concentric hub portion of said clutch disc means, adjacent annular portions of said hub portion and said power take-off means each having formed therein at least one conical depression at substantially equal distances from the center of said shaft, the respective conical depressions being complementally configured and aligned such that a biconical cavity is formed therebetween; at least one single ball means lodged in each biconical cavity formed by said power take-off means and said hub portion; spring means disposed about said shaft medially of said annular portion of said power take-off means and said clutch disc means, said spring means being maintained in compression by said adjacent power take-off means and clutch disc means; thrust bearing means rotatably disposed upon said shaft distally adjacent to said power take-off means; and annular terminal collar means affixed to said shaft distally adjacent to said thrust bearing means and so positioned axially of said shaft to maintain said foregoing elements in longitudinal alignment such that said spring means normally maintains said clutch disc means spaced apart from said power take-off means while maintaining all of said ball means in rolling contact within said biconical cavities.

2. The combination of claim 1 wherein said power take-off means comprises gear means and said annular portion comprises a flange formed medially of the gear teeth and the adjacent clutch disc means.

3. The combination of claim 1 wherein said power take-off means is engaged with complemental rotary power transmitting means, whereby upon the transmission of rotary power to said power take-off means therefrom said annular clutching portion of said clutch disc means is urged into clutching contact with said annular friction disc means.

4. The combination of claim 1 wherein said fixed housing means is an electric motor housing and said shaft comprises the rotor of said electric motor.

* * * * *